United States Patent [19]

Caveney et al.

[11] E Re. 29,037

[45] Reissued Nov. 16, 1976

[54] WIRE CABLE HARNESS ASSEMBLY APPARATUS

[75] Inventors: Jack E. Caveney, Hinsdale; Raymond F. Roberson, Plainfield; Joseph S. Rohaly, Alsip, all of Ill.

[73] Assignee: Panduit Corporation, Tinley Park, Ill.

[22] Filed: Sept. 2, 1975

[21] Appl. No.: 609,469

Related U.S. Patent Documents

Reissue of:

[64] Patent No.: 3,627,300
Issued: Dec. 14, 1971
Appl. No.: 20,926
Filed: Mar. 19, 1970

U.S. Applications:

[63] Continuation of Ser. No. 423,603, Dec. 10, 1973, abandoned.

[52] U.S. Cl. ..... 269/131; 24/132 R; 24/257 R; 53/390; 100/7; 248/68 R; 269/287

[51] Int. Cl.[2] ..... B65B 27/10; B65B 67/00; F16L 3/22

[58] Field of Search ..... 24/16 PB, 73 SA, 73 PB, 24/81 PE, 243 K, 257, 132; 29/203 MW; 53/3, 148, 198, 390; 100/7, 26, 212; 214/6 H; 248/60, 61, 68, 309; 269/130, 131, 132, 287; 294/87, 106

[56] References Cited

UNITED STATES PATENTS

| | | | |
|---|---|---|---|
| 593,978 | 11/1897 | Boehm | 24/81 BA |
| 2,774,079 | 12/1956 | Flatley | 5/89 X |
| 2,891,365 | 6/1959 | Heckel | 53/124 |
| 3,167,227 | 1/1965 | Walden, Sr. | 248/309 X |
| 3,286,963 | 11/1966 | Bergman | 248/316 D X |
| 3,427,959 | 2/1969 | Keil | 100/7 |
| 3,584,860 | 6/1971 | Ervin | 269/131 |

*Primary Examiner*—Roy Lake
*Assistant Examiner*—Neil Abrams
*Attorney, Agent, or Firm*—Charles R. Wentzel; Richard B. Wakely

[57] ABSTRACT

A holder for forming a plurality of strands of wire into a bundle for assembling a cable harness. The holder includes a frame having relatively movable arms [ of which the ends are in spaced relationship ] *terminating in opposing separate ends*. An elastic band is fastened on the frame to [yieldably hold the ends spaced and ] provide a cradle for the wires *and to coact with the ends to releasably retain the strands*.

16 Claims, 25 Drawing Figures

INVENTORS.
JACK E. CAVENEY
RAYMOND F. ROBERSON
JOSEPH S. ROHALY
BY Evan D. Robertson
ATTORNEY INVENTORS.
JACK E. CAVENEY
RAYMOND F. ROBERSON
JOSEPH S. ROHALY
BY Evan D. Roberts
ATTORNEY

INVENTORS.
JACK E. CAVENEY
RAYMOND F. ROBERSON
JOSEPH S. ROHALY

BY Evan D Roberts
ATTORNEY

WIRE CABLE HARNESS ASSEMBLY APPARATUS

Matter enclosed in heavy brackets [ ] appears in the original patent but forms no part of this reissue specification; matter printed in italics indicates the additions made by reissue.

*This is a continuation of reissue application Ser. No. 432,603, filed Dec. 10, 1973, now abandoned.*

BACKGROUND OF THE INVENTION

The present invention relates to electric wire harnesses, more particularly to a new and improved apparatus to facilitate the fabricating of wire harnesses.

Wire harnesses are commonly fabricated on a jig board on which are mounted various wire-holding devices. In practice, wires are inserted into these devices one at a time, and these devices must hold each wire in its installed location while the harness is being fabricated. When all wires have been so located, those wires lying on a common path are bound together with strap or string, or the like into a completed wire harness which is then removed from the jig board and installed in its intended end use.

Many existing wire holding devices do not hold such groups of wires into a circular grouping which is most desirable to insure that binding devices will remain snug after the wire harness is removed from the jig board. For example, if a group of wires is not circular when a binder is applied, the binder will subsequently be loose when the wire harness is removed from the jig board and the wires are free to assume a circular grouping. Also, in addition to the foregoing, it is highly desirable to retain the wires at a distance from the jig board to facilitate the looping of a binder strap around the wires and to allow appropriate buildup of a round group of wires.

Further, it is an object of this invention to provide a wire bundle retainer which will accommodate a wide range of bundle sizes and to hold irregularly shaped objects. Also, it is an object of this invention to provide a retainer having an elastic for gripping objects which has a limiting elastic characteristic which will provide nonelastic strength after a predetermined elastic stretch.

SUMMARY OF THE INVENTION

By the present invention it is proposed to provide a wire cable forming device which overcomes the difficulties encountered heretofore in forming and maintaining a tight bundle during the formation of a cable harness assembly.

In accordance with the present invention, this is accomplished by a wire cable forming device including a frame having a pair of opposing arms of which the ends are spaced and moved relative to each other to permit the insertion of wire strands therebetween. A resilient band is attached to said base and disposed on the arms to span the space between the latter to yieldably maintain the arms in closely spaced relation to prevent strands of wires from passing upwardly through the space. The band is also arranged so as to retain a bundle of wires tightly gripped below the underside of the arms after the strands of wire are inserted between the spaced ends.

In one form of the invention, bellcranks pivotally mounted on the frame, provide opposing arms of which the wire strand restraining ends are movable between a closely spaced position to a widely spaced position. The pivotal mounting of the arms is such that upon the insertion of a strand or a bundle of wires in the cradle formed by a resilient band spanning the space between the adjacent ends of the arms, the bands yieldly draws the opposing strand restraining arms inwardly to lock the arms against inadvertent outward pivoting to an open position through which the bundle or a wire strand may be inadvertently ejected and holds the strands of wire in a compact tight group.

In a further form of the invention, the strand restraining arms are yieldably restrained against outward movement by lock pin means engageable with other arms of the bellcrank. The bellcranks are mounted so that the arms may be moved out of engagement with the lock pin means to permit outward movement of the arms and removal of an assembled bundle.

In another form of the invention, the arms are made from a flexible material and fixed at one end to a base. The other ends of the arms are spaced. The resilient band is arranged to span the ends of the arms and to yieldably hold the ends of the arms in a wire-retaining position.

As a further adjunct to the foregoing embodiment one of the arms may have a gate pivotally attached adjacent one end. The gate is insertable between the yieldable arms to restrict the passageway between the spaced ends.

A still further embodiment of the invention similar to the immedite foregoing embodiments includes resilient and compressible material disposed between the space between the ends of the yieldable arms. The compressible material is arranged to provide a slit through which the wires are inserted into the loop formed by the resilient band spanning the spaced ends of the arms.

DESCRIPTION OF THE PREFERRED EMBODIMENTS

Figure 1:
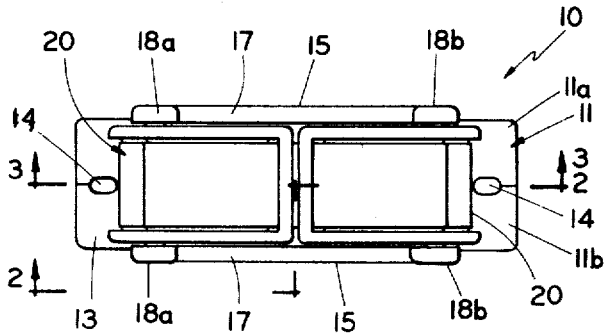
FIG. 1 is a plan view of a preferred embodiment of a wire bundle assembly apparatus illustrating the principles of the present invention.

Referring now to FIGS. 1–6 there is shown a preferred embodiment of a wire bundle retaining and forming apparatus or holder 10 for use with a wiring harness jig board to form tight and compact bundles of wires of substantially circular cross section or to retain other items. One example would be a plurality of the holders 10 adapted to be suitably fixed in predetermined spaced relationship, as by bolting on a jig board or the like (not shown). Strands of wires are then assembled in the holders on the jig board to form tight bundles which are secured together by conventional straps, binders, or the like (not shown) to aid in the formation of wire cable harnesses. The formed wire cable harnesses are then removed from the holders 10 on the jig board for subsequent installation in the equipment in which the harness or harnesses are to be used or incorporated. The wire cable harnesses are preferably formed in a tight wire bundle of substantially circular cross sections.

The holder 10 includes a frame 11 which may be made, as by casting a pair of symmetrical parts 11a and 11b, (FIG. 1) which are assembled in abutting relationship along a longitudinal plane by means of rivets 12. The frame 11, as illustrated, includes a two-part base 13 having openings 14 at each end for accommodating fastening means, such as screws or the like, for fastening the holder assembly 10 on a harness jig board.

Projecting upwardly from opposed major sides of the base 13 of frame 11 are a pair of spaced upstanding walls 15 (FIG. 1). Extending transversely between the walls 15 along each end are complementary bosses 16 through which the rivets 12 extend joining the halves 11a and 11b. The walls 15 are each formed with a substantially U-shaped cutout portion 17 which defines a pair of upright spaced legs 18a–18b on each of the walls 15a–15b.

Bellcranks 20 are pivotally mounted adjacent and between the upper ends of the complementary legs 18a of wall 15a and 18b of wall 15b by means of respective horizontal pins 19. The bellcranks 20 each include a retainer arm 21 formed integral with a depending arm 22 extending generally normally thereto. The retainer arms 21 are each adapted to overlie the opening defined by cutouts 17 with free pinlike ends 23 thereof normally disposed in closely spaced relationship as hereinafter discussed. The depending arms 22 of bellcranks 20 are adapted to be normally respectively disposed between the legs 18. It is to be noted that the pivot pins 19 are fastened to, and project from bellcranks 20 and are movably disposed in vertically elongated slots 24 formed in legs 18. This pin and slot relationship assists in maintaining the arms 21 normally disposed over the wire bundle, as more fully explained hereinafter.

A longitudinally extensible elastic or resilient band 25 which may have a predetermined limited extensibility and that has a width which spans the space 23a (FIG. 3) between the respective ends 23 of the retainer arms 21, is normally positioned over the bellcranks 20, and serves as a wire bundle cradle. Each end of the band 25 is formed with a loop 26 which is inserted over a pin 27 (FIG. 3) extending between frame halves 11a and 11b adjacent the lower portion thereof. The band 25 is then wrapped over pins 28 extending across surface 29 formed in the depending arms 22 of the bellcranks 20. Thereafter, the band 25 is positioned about pins 30 disposed on the frame 11a–11b, inwardly of, and above the pins 27. A stop pin 31, mounted on legs 18, engages the band 25 prior to being disposed against a surface 29a of the arm 22 of the bellcranks 20. The band 25 is disposed through slots 32 spaced adjacent to the free ends 23 of the arms 21, is retained by pin ends 23 upwardly thereof, spans the space 23a between the closely adjacent free ends 23.

Figure 2:
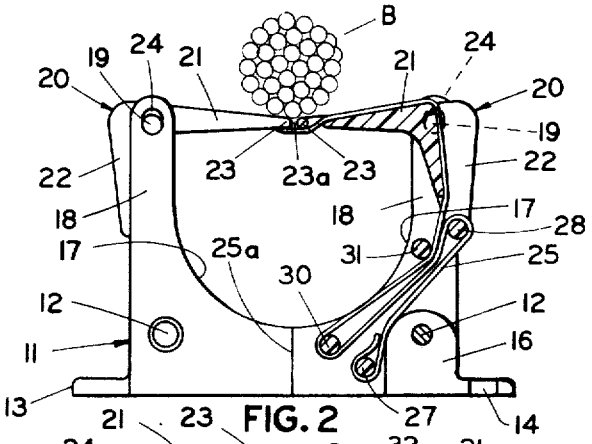
FIG. 2 is an elevation view of the apparatus of this invention sectioned along line 2—2 of FIG. 1 showing the normal, unsprung, wire-retaining position of the elements thereof with a bundle or single wire positioned for insertion therein.
Figure 4:
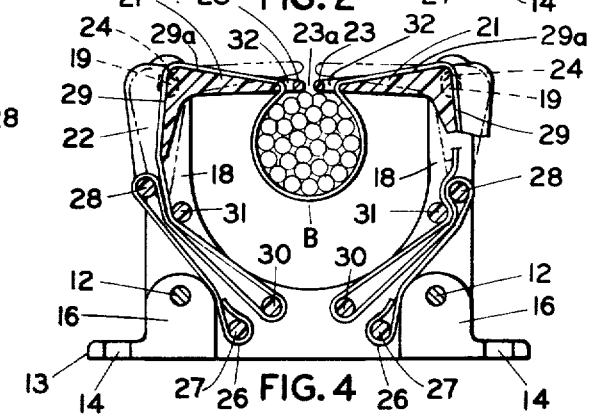
FIG. 4 is an elevation sectional view taken along line 3—3 of FIG. 1 showing the position of the elements of the apparatus with a bundle retained therein, with a supplemental showing of the extent to which the retaining arms can pivot from the normal unsprung position without overcoming the retention action of stop pins.

The band 25 is tensioned to apply a force tending to maintain the ends 23 of the arms 21 normally in a horizontal position against upward and downward movement as shown in FIG. 2. In this connection, it is to be noted that the pins 31 are disposed in close proximity to the lower end of the depending arms 22 in the normal position (FIGS. 2 and 4). When thus positioned, the band 25 is operative to apply a force on the ends 22 tending to prevent inward rocking movement thereof toward the center line 25a (FIG. 2). This tends to maintain the arms 22 normally positioned as shown in FIG. 2.

The holder 10, as shown, is adapted for receiving either individual strands of wire to initiate the formation of a harness cable or to receive additional wires being added to a partially completed bundle of wires. A partially completed handle B is shown (except FIG. 5), in phantom, and to which there is to be added one or more additional wires. The partially completed bundle B is used herein only for the purpose of facilitating the explanation of the operation of the holder 10.

Referring now to FIG. 2, the partially assembled bundle B is shown positioned on the upper surface of the retainer arms 21 of the bellcranks 20 is their normal stable position. The bundle B is pushed downwardly against the upper surface of ends 23 adjacent the portion of the band 25 spanning the space 23a causing the bellcranks 20 to pivot about the pins 19 whereupon arms 21 turn inwardly, as shown (FIG. 3) towards the U-shaped cutout 17 against the opposing resilient force exerted by the elastic band 25. It is to be noted that under these conditions. the ends 23 of the arms 21 are spaced sufficiently so that the bundle B is cradled on band 25. When the wire or bundle is moved inwardly beyond the ends 23 of arms 21, the arms 21 return to the full line position (FIG. 4) and the bundle B will be trapped below the arms 21.

Figure 5:
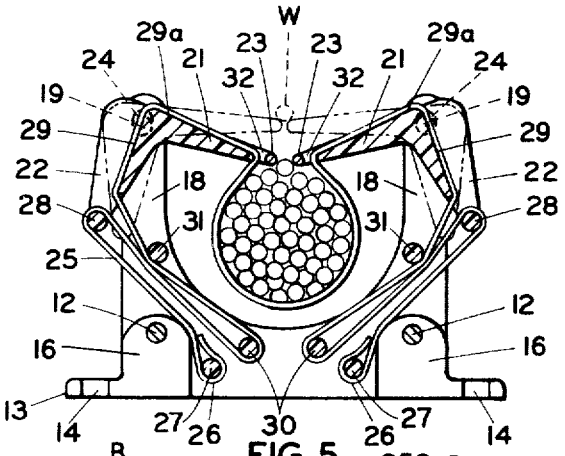
FIG. 5 is an elevation sectional view taken along line 3—3 of FIG. 2 showing the sprung and unsprung positions of the retaining arms when a single wire is urged into a retained bundle.

As shown in FIG. 5 a strand of wire W is then placed on the arms 21 and pushed downwardly whereupon the arms 21 pivotally move to the full line position. As the arms 21 moved downwardly, the elastic band 25 is tautly disposed about the wires already in the bundle B so that the cross section configuration of the bundle B remains substantially circular after the wire W is inserted in the bundle and the externally applied force is removed the arms 21 return to the position of FIG. 4 with the bundle and added wire W disposed below the arms 21. At the same time it is to be noted that the wire W inserted into the bundle B is disposed in engagement between the ends 23 of the arms 21 so that inadvertent displacement of any of the other wires from its position in the bundle is prevented. Also, when band 25 is provided with the limited extensibility, band 25 will limit the size of bundle B according to the maximum extensibility thereof. After insertion of the wire W the arms 21 return to the full line position of FIG. 2.

Figure 3:
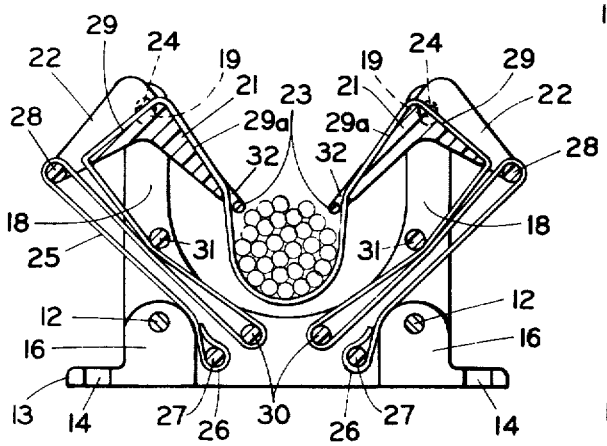
FIG. 3 is an elevation sectional view taken along line 3—3 of FIG. 1 showing the sprung position of the retaining arms thereof and a bundle inserted in the apparatus substantially beyond the retaining arms.
Figure 6:
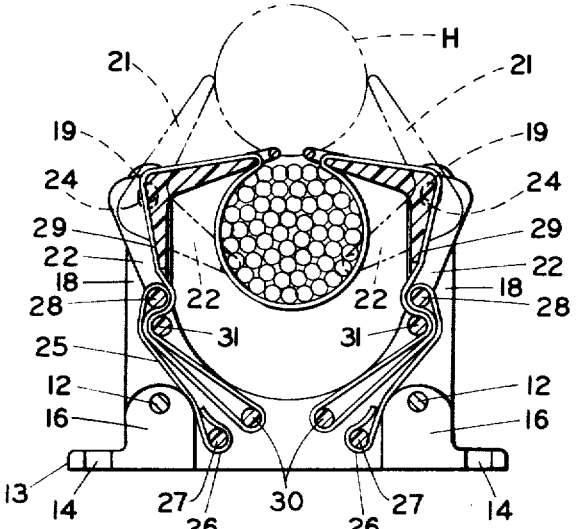
FIG. 6 is a sectional view taken along line 3—3 of FIG. 1 showing two positions of the retaining arms as a bundle is retracted from the apparatus.

After a bundle has been completed, one or more suitable straps (not shown) are fastened about the wires of the bundle B to retain them in position and thereby form a wire cable harness. The cable harness H is now ready for removal from the holder 10 (FIG. 6). Removal is accomplished by pulling upwardly on the cable harness H. As the completed harness H is forced upwardly, the bellcrank pivot pins 19 also slide upwardly in the slots 24 so that the bellcranks 20 are now spaced a greater distance above the pins 31 than before (FIG. 3). This permits easier pivoting movement of the bellcranks 20. Further upward pulling of the harness 11 causes the arms 21 to assume the position shown in phantom lines so that the harness 11 is free to be extracted from the holder 10. The pivoting movement of the bellcranks 20 is resisted by the elastic band 25 so that upon removal of the bundle, the elastic band is automatically operative to return the bellcranks beyond pins 31 to the normal position (FIG. 2).

Figure 7:
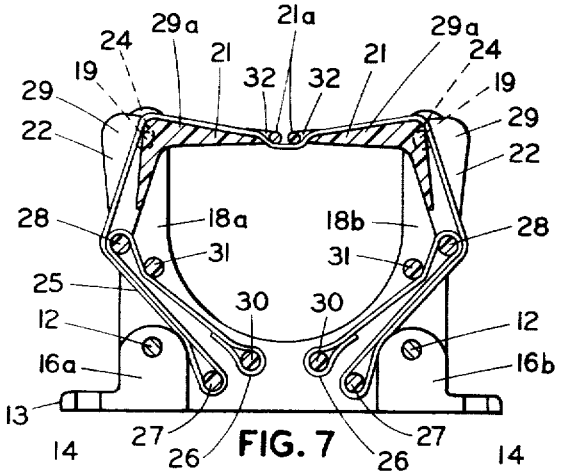
FIG. 7 is an elevation sectional view showing another embodiment of the apparatus of this invention and illustrating a variation in the application of the elastic band thereof.

Referring now to FIG. 7, there is shown a modified arrangement for threading the elastic band 25 on the holder 10. As shown, the looped ends 26 of the band 25 are attached to the studs 30 so that the closely disposed runs of the band lie adjacent to the bosses 16.

Figure 8:
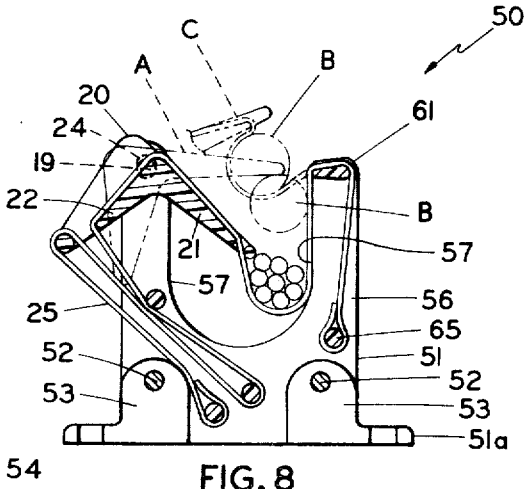
FIG. 8 is an elevation sectional view of another embodiment of the apparatus of this invention showing one movable retaining arm with a stationary retaining arm, and illustrated insertion and retraction of a bundle therebetween.

FIG. 8 illustrates another embodiment of the invention wherein the parts similar to parts of the embodiment of FIGS. 1–6 have been designated alike. The holder 50 comprises a frame 51 made of two longitudinal symmetrical halves 51a which are joined together be rivets 52 extending through bosses 53. The bosses 53 are formed on a base 54 from the sides of which there are upstanding sidewalls 56 having U-shaped cutouts 57. Pivotally mounted on one leg 58 defining the U-shaped cutout 57 is a bellcrank 20. A horizontally disposed arm 61 is fixedly secured to the other leg. The fixed arm 61 is formed with a slot 62 adjacent the end 63.

An elastic band 25 is trained over the studs 27, 30 and 31 and over the bellcrank pin 28 and through the slots 32 and 62 similarly to embodiment of FIGS. 1–6. Thereafter the elastic band 25 is thread through the slot 62 of the stationary arm 61 and over the outer end thereof and finally looped and fixed on a stud 65.

The elastic band 25 is tensioned so that the arms 21 of the bellcrank normally assumes the position shown in the phantom line designated A. The insertion of the bundle B (or single wire) is accomplished by forcing the arm 21 downwardly so that the bellcrank arm 20 is rocked on pivot pin 19 received in the slot 24 to the full line position shown. Upon release of the insertion force, the bundle B returns to the phantom line position designated B. In this position, additional individual strands of wire may be inserted in the manner described in connection with FIGS. 1–6. To remove the completed harness, the bundle is pulled upwardly so that the arm 21 assumes the position shown in the phantom line position designated C. In this position, the bundle B is free to be removed. After removal of the bundle B, band 25 returns arm 21 to the phantom position A.

Figure 9:
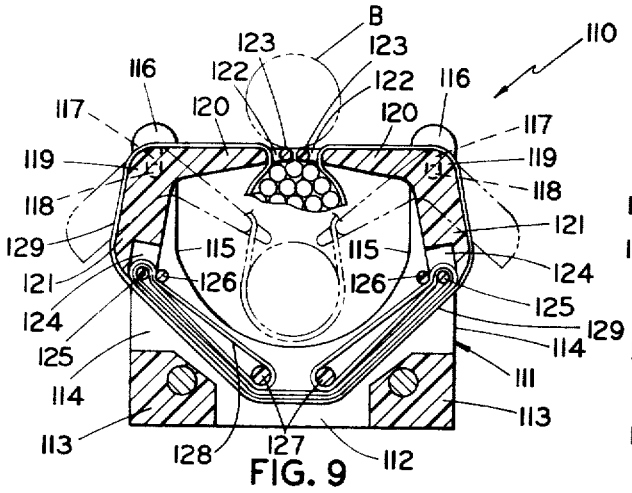
FIG. 9 is an elevation sectional view of another embodiment of the apparatus of this invention showing the variation and utilization of the application of the elastic spring therefor and illustrating a bundle (or a single wire) before insertion, after insertion, and normal retained position therein.
Figure 10:
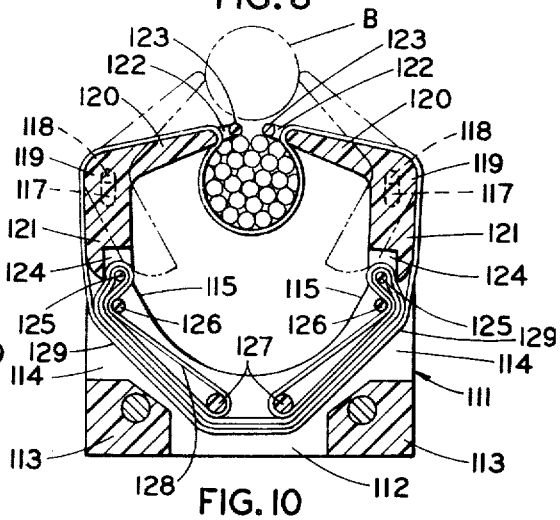
FIG. 10 is another elevation sectional view of the embodiment illustrated in FIG. 9 showing two illustrative positions of the elements thereof as a bundle is removed from the apparatus.

A further embodiment of a wire bundle holder 110 is illustrated in FIGS. 9 and 10. The holder 110 comprises a frame 111 formed from a pair of symmetrical half frames 111a of which one-half is shown. The frame 111 includes a base 112 at the ends of which there is formed a pair of bosses 113 through which rivets extend to join the frame halves 111a.

Extending upwardly from the sides of the base 112 are sidewalls 114. The sidewalls 114 are each formed with a U-shaped cutout 115 defined by legs 116. Each of the legs 116 is formed with an elongated slot 117 adjacent the upper end thereof. Turnably seated in the elongated slot 117 are pivot pins 118 fixed to bellcranks 119. The bellcranks 119 each include an arm 120 for retaining a wire bundle confined in the U-shaped cutout 115 and a downwardly depending arm 121. The retaining arms 120 are formed with slots 122 adjacent the ends 123 thereof. As shown, the ends 123 of the arms are in closely spaced and opposing relationship.

The depending arms 121 are formed adjacent the ends thereof with recesses 124 through which pins 125 extend. Stop or lock pins 126 are disposed in the path of rotation of the ends of depending arms 121 when the pivot pins 118 are located in the lower portion of the pivot slots 117. The lock pins 126 serve to prevent inward rocking movement of the depending arms 121 so that retainer arms 121 are restrained from moving to the position shown in phantom in FIG. 10.

A continuous elastic band 128 is anchored on pins 127, positioned between pins 125 and 126, around pins 125 through slots 124, and adjacent the band 128 on pins 126 and 127. A second elastic band 129 is positioned under and partially around band 128, cranks 119, through slots 122 and across the opening between crank 119. Elastic band 128 is tensioned adequately to normally hold the bellcranks 119 with the retainer arms 120 positioned as shown in full lines in FIG. 9. The doubled bands 128 and 129 in the lower portion provides additional specific restraint against outward rotation of the lower arms 121.

To insert a wire or bundle B into the holder 110, B is positioned as shown in FIG. 9 on the retainer arms 120. The bundle or wire B is forced downwardly to the position shown in phantom lines whereupon the bellcrank 119 rotates to the phantom position. When the wire or bundle B is moved inwardly beyond the ends 123 of arms 119, the bundle B and the arms 119 will tend to return to the full line position. The wires are inserted in substantially the same manner as illustrated and described in connection with FIG. 5 of the embodiment of FIGS. 1–6. It is to be noted however that after insertion of a wire, the retainer arms 120 are restrained against outward movement by the lock pins 126.

To remove the harness H from the assembly 110 the latter is pulled upwardly causing the pivot pins 118 to slide upwardly in the slots 117 so that the ends of the depending arms 121 clear the lock pins 126. Upon further upward pulling on the bundle B the arms 121 are free to rotate toward each other while the retainer arms 120 rotate away from each other as shown in phantom lines in FIG. 10. In this position of the arms 120, the bundle B is free to be removed from the holder 110.

Figure 11:
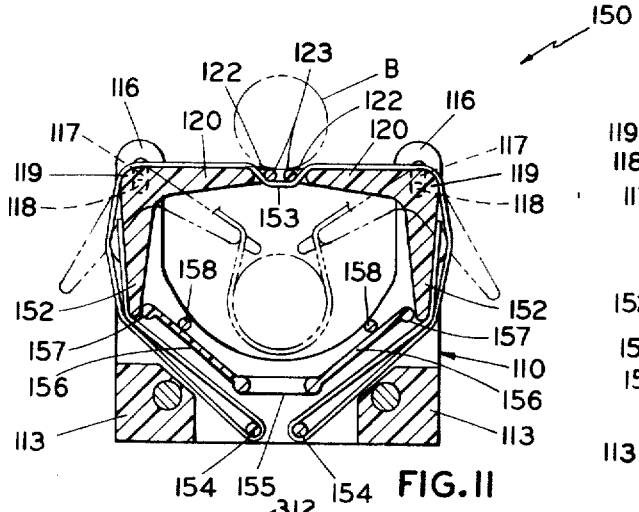
FIG. 11 is an elevation sectional view of another embodiment of the apparatus of this invention showing the two illustrative positions of the retaining arms with respect to a resilient leaf stop during entry of a bundle for retention.
Figure 12:
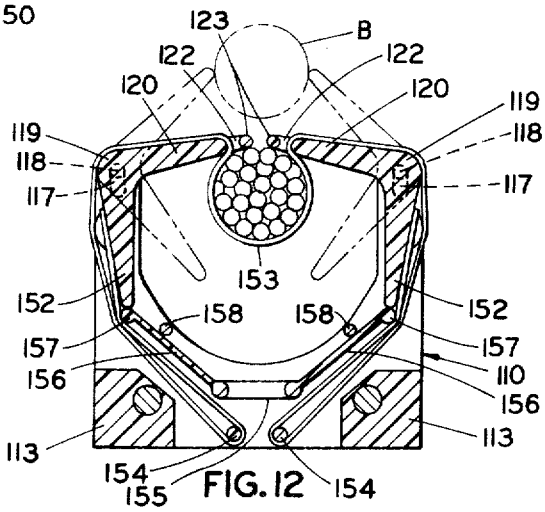
FIG. 12 is an elevation sectional view of the embodiment illustrated in FIG. 11 showing the illustrative position of the elements thereof as a bundle is removed from the apparatus.

In a further embodiment of holder 150 illustrated in FIGS. 11 and 12 the multiple layer elastic band arrangement has been eliminated. The holder 150 is similar in some respects to the holder 100 of embodiments of FIGS. 9 and 10 and includes an identical frame 110. The elements which are identical to those of FIGS. 9 and 10 are identified by like reference characters. The bellcrank 151 includes the retainer arms 120 and downwardly depending arms 152. The bellcrank 151 is pivotally mounted on the frame 111 in the same manner as described in connection with FIGS. 9 and 10 by means of pivot pins 118 turnable and slidably in slots 117 formed on the legs 116.

Fixed to the outer surfaces of the depending arms 152 are the ends of an elastic band 153 which is positioned over studs 154 the arms 152, retainer arms 120 and through the slots 122 formed adjacent to the ends of the latter. The elastic band is tensioned to hold the arms against a flexible stop 154.

The flexible stop 154 is made from plastic or the like and includes a central attachment means 155 fixed to the frame 116. Extending from the attachment means 155 are resilient leaves 156 which terminate in horizontal posts 157. The posts 157 engage the ends of the arms 152 and serves as a stop as shown in FIG. 11. The flexible leaves 156 are stiffened by pins 158 fixed to the frame and disposed intermediate the ends thereof.

The bundle B and wires are inserted into the holder 150 in the same manner as discussed above in connection with the embodiment of FIGS. 9 and 10. Upon insertion of the bundle B into the fixture the retainer arms 120 assume the position shown in phantom lines in FIG. 11. Upon release of the inserted bundle B the retainer arms 120 return to the full line position of FIG. 12.

When the cable harness assembly H is completed and secured with cable straps, the harness assembly H is removed by pulling upwardly, the upward pulling causes the pivot pins 118 to ride upwardly in the slots 117, whereupon the ends of the depending arms 152 clear the posts 157. This permits the bell cranks 151 to assume the position shown in phantom in FIG. 12 so that the bundle B may be removed.

Figure 13:
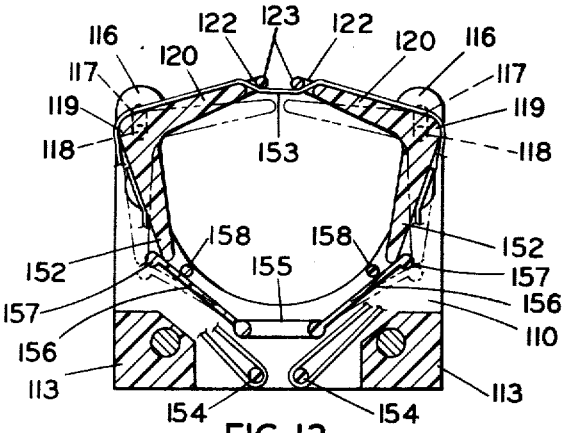
FIG. 13 is an elevation sectional view of the embodiment illustrated in FIG. 11 showing the interaction and relative position of the retaining arms and the resilient leaf stop when the retaining arms are returned to the normal unsprung position.

After removal of the cable harness H the elastic band 153 is operative to return the arms 120 to the full line position of FIG. 13. In this position the arms 120 engage the posts 157 on the inboard side thereof and thereby prevent return to the locked position. Return to locked position is accomplished by pushing downwardly adjacent the ends of arms 121 whereupon the leaves 156 are flexed downwardly by the depending arms 152 as shown in phantom lines. The ends of depending arms 152 then return to the locked position shown in FIG. 11.

Figure 14:
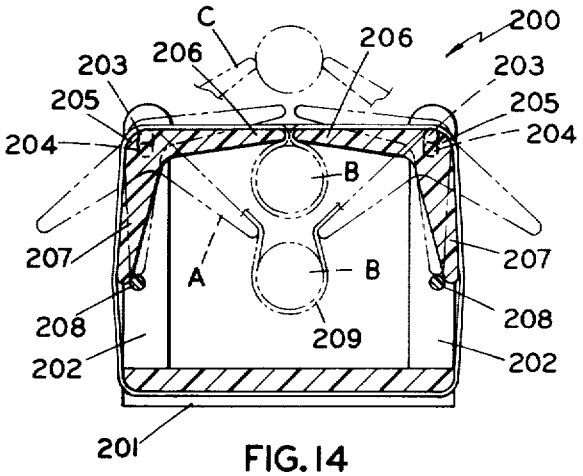
FIG. 14 is a plan sectional view of another embodiment of this invention illustrating a single elastic band around the elements thereof and showing four illustrative positions of the retaining arms, namely sprung, normal, partially released, and fully released positions.

Referring now to FIG. 14 there is shown another embodiment of a bundle holder 200 comprising a base 201 having upstanding posts 202 adjacent each end thereof. Each of the posts 202 is formed with elongated slots 203 in which there is pivotally received pivot pins 104 of bellcranks 205. The bellcranks 205 each include a retaining arm 206 and a downwardly depending arm 207. Fixed to the posts 202 are stop pins 208 which are engageable with the ends of the downwardly depending arms 207.

A continuous elastic band 209 embraces the base 201 and the bellcrank arms 207 and 206 to normally hold the depending arms 207 in engagement with the stop pins 208. A bundle of wires B is inserted into the holder 200 by forcing the arms 206 downwardly to the position shown in the phantom lines designated A. Upon release of the downward force the bundle B returns to the full line position. Strands of wire may then be inserted into a similar manner.

Removal of a cable harness H is accomplished by lifting the harness upwardly. This causes the ends of the arms 207 to be elevated above the stop pins 208 so that further upward movement permits the bellcrank to rotate so that the retainer arms 206 assume the phantom line position designated C. The retainer arms 206 are sufficiently spread to allow removal of the completed harness.

Figure 15:
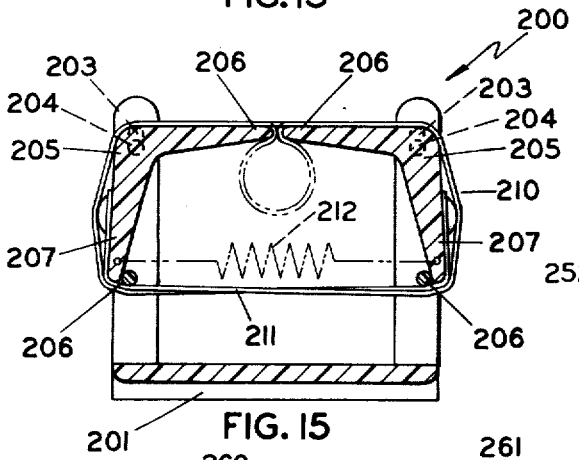
FIG. 15 is an elevation plan view of another embodiment of the apparatus of this invention illustrating a single elastic band doubly applied directly across the retaining arm stops with the retaining arms in normal position and retaining a bundle and illustrating an alternate spring application between the retaining arms.
Figure 18:
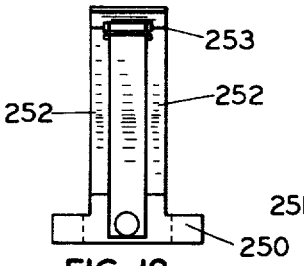
FIG. 18 is a side elevation view of another embodiment of the apparatus of this invention similar to the one in FIGS. 16 and 17.
Figure 19:
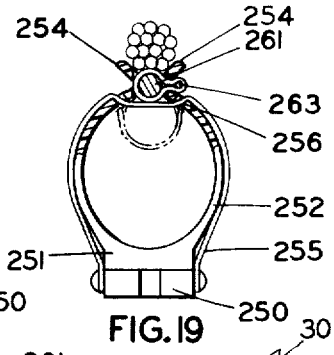
FIG. 19 is a partially sectioned elevation view of the embodiment illustrated in FIG. 18 showing a wire (or bundle) positioned against the gate for insertion into the apparatus.
Figure 20:
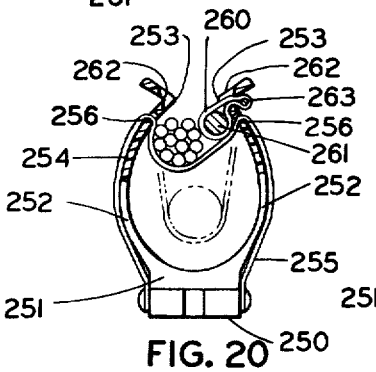
FIG. 20 is a partially sectioned elevation view of the embodiment illustrated in FIG. 18 showing the position of the retaining arms and the gate with respect to a bundle (or a single wire) being inserted therein.

FIG. 15 illustrates a modification of the structure shown in FIG. 14. In this arrangement a continuous elastic band 210 is disposed in direct embracing relationship about the bellcranks 205. To assure that the depending arms 207 are retained against the stop pins 206, the elastic 210 is doubled at 211. Alternatively, or in addition thereto, a spring 212 as shown in phantom.

Referring now to FIGS. 16–24 there is shown further embodiments of a cable assembly holder embodying the principles of the present invention. Common to each of the different embodiments are a pair of resilient opposing arms which are movable to permit the insertion and removal of wires and a bundle of wires to form an electrical cable harness.

Figure 16:
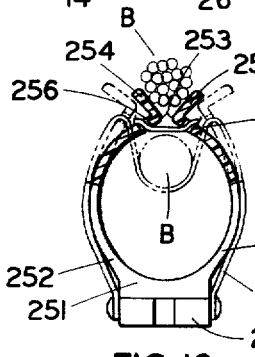
FIG. 16 is a partially sectioned elevation view of another embodiment of the apparatus of this invention showing resilient retaining arms movable between a locked position to an open position as the bundle (or a single wire) is inserted therebetween.
Figure 17:
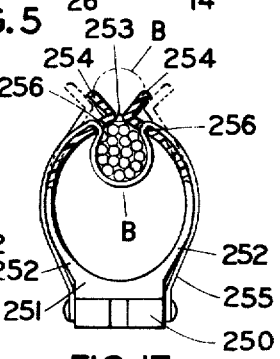
FIG. 17 is a partially sectioned elevation view of the embodiment illustrated in FIG. 16 showing illustrative positions of the retaining arms as a bundle is moved from the retained position to the released position.

FIGS. 16 and 17 disclose one modification comprising a base 250 on which there is suitably attached a substantially U-shaped yoke 251. The yoke 251 includes a pair of bowed arms 252 each of which terminate at the upper end 253 thereof in outwardly diverging limbs 254. The diverging limbs 254 provide a guide or seat for inserting wires or a bundle of wires into the holder. The arms 252 are formed so as to be yieldable so th at the spacing at the ends 253 may be increased to permit the insertion and removal of the wires.

Also yieldably restraining the arms 252 against outward movement is an elastic strap 255 of which the ends are fastened to opposite sides of the base. The elastic strap 255 is positioned through openings or slots 256 formed adjacent the ends 253 and is applied in tension to maintain the ends 253 in closely spaced relationship to preclude inadvertent ejection of wires therethrough as more fully to be explained hereinafter.

To insert a wire bundle B into the holder 250 the bundle is initially seated on the diverging limbs 254 as shown in FIG. 16. Thereafter the bundle B is pushed downwardly so that the arms 252 are spread against the force exerted by the elastic strap 255 and into cradling engagement with the elastic strap 255 as shown in phantom lines. Upon release of the pushing force the bundle B is returned and urged to the full line position shown in FIG. 17 by the elastic strap 255. Additional strands of wire may then be added to the bundle B. It is to be noted that the elastic band 255 serves to maintain the bundle tight while wires are being added.

FIGS. 18–21 disclose a modification of the holder 250 shown in FIGS. 16 and 17. To assure that the holder is capable of retaining wire having wider tolerances there is provided a movable gate 260 in the form of a rod 261. The rod 261 is pivotally secured to the limb 254 in a slot 262 by means of a looped wire 263. Upon insertion of a wire or bundle B the gate 260 is turned inwardly to the position shown in FIG. 20. The gate 260 thus restricts passage through the space between the ends 253 so that a wire may not inadvertently be released therethrough.

Figure 21:
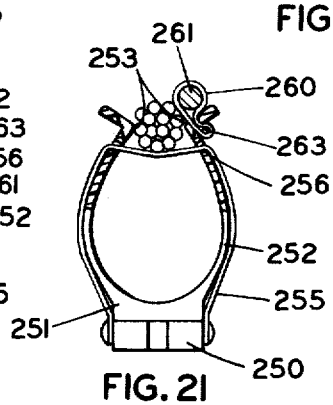
FIG. 21 is a partial elevation view of the embodiment illustrated in FIG. 18 showing the reaction between the gate and a bundle (or single wire) as the bundle is removed from the apparatus.

The bundle B is initially inserted into the holder to the position shown in phantom lines by applying a downward force. The bundle returns to the position shown in full lines under the force exerted by the elastic strap 252. Insertion of individual wires is accomplished in substantially the same manner. Removal of a completed cable harness is accomplished by lifting the bundle upwardly through the space between ends 253, whereupon the gate 260 is moved upwardly as shown in FIG. 21.

Figure 22:
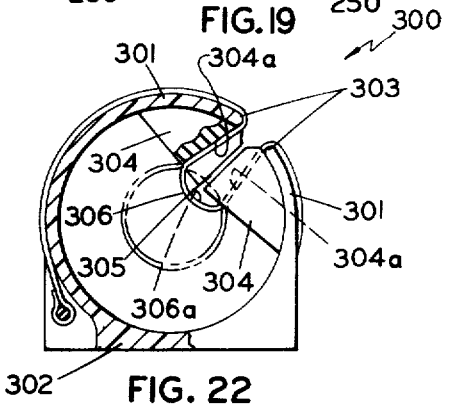
FIG. 22 is a partially sectioned elevation view showing the interreaction of a wire or bundle inserted in an elastic band positioned over resilient retaining arms and blocks.

FIG. 22 shows another embodiment 300 of a holder wherein the arms 301 of a yoke 302 are generally arcuate and terminate in spaced ends 303. Suitably adhered to underside of the arms 302 are a pair of blocks 304 of a suitable resilient material such as sponge rubber or the like. The blocks 304 are formed with flat faces which are maintained in spaced relation to provide a slit 305 through which single or bundle of wires may be inserted. An elastic band 306 is inserted through passages 304a in blocks 304 to form a loop 306a below the wire entry slit 305. Individual strands of wire may then be inserted through the slit 306 and into loop 306a formed by the elastic band 306 to form a retained bundle as shown in phantom (FIG. 22).

Figure 23:
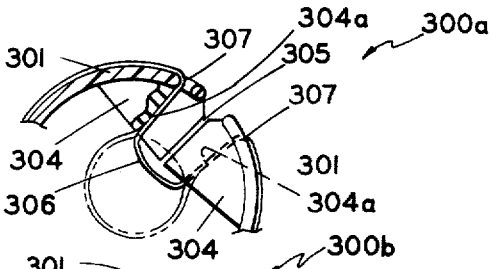
FIG. 23 is a partial sectional view of a modification of an embodiment illustrated in FIG. 22 showing the elastic band threaded through the arms.

FIG. 23 discloses another variation of the embodiment shown in FIG. 22 and has a slot 307 formed in arms 301a to provide a guide through which the elastic band 306 passes and is inserted through the passages 304a in the resilient blocks 304.

Figure 24:
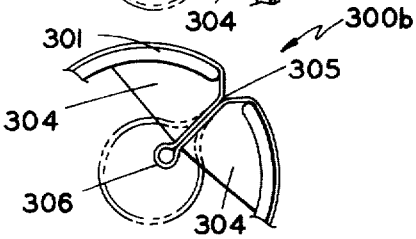
FIG. 24 is a partial sectional view of the embodiment of the invention illustrated in FIG. 22 showing illustrative positions of the elastic before and after the insertion of a wire or a bundle.

FIG. 24 discloses still another variation of the embodiment shown in FIG. 22 and has the elastic band 306 positioned over the ends 303 of arms 301 and directly in slit 305 between the blocks 304.

Figure 25:
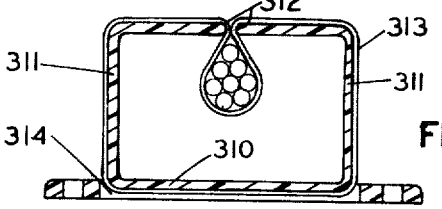
FIG. 25 is a sectional view of a single-piece frame embodiment of the invention.

FIG. 25 further discloses still another embodiment of the invention and includes a frame 310 having resilient arms 311 with spaced ends 312. An elastic band 313 is positioned through slot 311 in frame 310, around arms 313, and adapted to receive and retain wires or other objects through arm ends 312 as shown.

In a further modification the elastic band 306 may be directly inserted through the slit 305 in the block as shown in FIG. 24.

Various modes of carrying out the invention are contemplated as being within the scope of the following claims, particularly pointing out and distinctly claiming the subject matter which is regarded as the invention.

What is claimed is:

[ 1. A holder for retaining objects comprising a frame, a pair of arms on said frame terminating in opposing spaced ends, said arms being movable relative to each other to vary the spacing between said opposing ends from a normal retaining position to an insertion or removal position, and an elastic band embracing said arms and spanning said ends for receiving objects inserted between said ends and for yieldably holding said arms in said retaining position to prevent inadvertent removal of said object.]

[ 2. The holder as defined in claim 1 wherein said arms are bellcranks pivotally mounted on said frame and have second depending arms, and wherein said elastic band is operative to restrain said second arms against turning about said pivot means thereby to maintain said first mentioned arms in said retaining position.]

[ 3. The holder as defined in claim 1 wherein said first mentioned arms are each formed with a slot adjacent said ends, and wherein said elastic band is inserted through said slots so as to underlie said ends of said first mentioned arms and to span said space.]

[ 4. The holder as defined in claim 2 wherein said elastic band is connected to the ends of said second depending arms for yieldably positioning said first mentioned arms in said retaining position.]

[5. The holder as defined in claim 2 wherein said pivot mounting means comprises pivot pins disposed in elongated slots whereby said pivot pins are free to be moved in said slots to a position wherein an object may be removed from between said arms, and wherein said band is operative to yieldably return said arms to the retaining position.]

[6. The holder as defined in claim 5 wherein stops are mounted on said frame and said elastic band is operative to yieldably hold said depending arms against said stops thereby to position said first mentioned arms in said retaining position.]

[7. The holder as defined in claim 6 wherein said stops are flexible so as to be displaceable and ineffective with respect to said second arms of said bellcranks when returning said first mentioned arms from said removal to said retaining position.]

[8. The holder as defined in claim 2 wherein said frame includes a pair of upstanding spaced walls, and wherein at least one of said arms is a crank arm having a second depending arm, and said elastic band is wrapped about said depending arm to maintain said first mentioned arm in said retaining position.]

[9. The holder as defined in claim 8 wherein one of said arms is fixedly and rigidly secured to said frame.]

[10. The holder as defined in claim 2 wherein said elastic band is a strap attached at each end to said frame.]

[11. The holder as defined in claim 2 wherein said elastic band is a continuous band.]

[12. The holder as defined in claim 2 wherein said second depending arms are connected by a spring extending therebetween.]

[13. The holder as defined in claim 1 wherein said arms are flexible and said elastic band is attached to yieldably hold said ends in said retaining position.]

[14. The holder as defined in claim 13 wherein a gate is pivotally attached to one of said arms for insertion between said arms when an object is inserted therebetween to prevent inadvertent removal of objects through said space between said ends.]

[15. The holder as defined in claim 13 wherein a pair of resilient blocks are fastened to said arms adjacent said ends and disposed to provide a restricted slit through which said objects are inserted, and said elastic band extends through said blocks and spans said slit to receive said object.]

[16. The holder as defined in claim 15 wherein said band extends through said slit and forms a loop at the inner end thereof.]

[17. The holder as defined in claim 1 wherein one of said arms comprises a fixed portion of said frame.]

[18. The holder as defined in claim 1 wherein said elastic band is adapted to receive and retain wires in a bundle.]

[19. The holder as defined in claim 1 wherein said elastic band includes two elements comprising resilient material for elasticity, and nonresilient material for limited extensibility.]

20. A holder for retaining objects comprising a frame, a pair of arms on said frame terminating in opposing spaced ends, said arms being movable relative to each other to vary the spacing between said opposing ends from a normal retaining position to an insertion or removal position, and [an] elastic band embracing said arms and directly spanning said ends for receiving a varying number and size of objects inserted between said ends and for holding said objects.

*21. A holder for retaining objects comprising a frame, a pair of arms on said frame terminating in opposing ends, at least one of said arms being movable relative to the other to vary the spacing between said opposing ends from a normal retaining position to an insertion or removal position wherein said ends are spaced to define an opening therebetween, biasing means for biasing said one of said arms into said retaining position and a longitudinally extensible elastic band disposed across and adjacent to said opening, said band having a first position wherein a portion of said band is disposed adjacent said ends and a second position wherein said portion is spaced from said ends and disposed between said frame and said arms, said objects being disposed between said ends and said portion when said band is in said second position and said objects are retained in said holder, said band comprising means for resiliently urging said objects toward said ends and being adapted to move from said first position to said second position in response to insertion of an object between said ends whereby an object inserted between said ends is releasably retained by the coaction of said elastic band and said arms.*

*22. The holder of claim 21 wherein each of said arms is movable relative to the other and wherein said elastic band engages a portion of the opposing ends in the normal retaining position before objects are inserted between said ends.*

*23. The holder of claim 22 wherein each of said arms is provided with a slot and wherein said elastic band is positioned through said slots so as to underlie the opposing ends.*

*24. The holder of claim 21 wherein said biasing means comprises a spring.*

*25. A holder as set forth in claim 21 wherein said elastic band is connected to said one of said arms and wherein said biasing means comprises said elastic band.*

*26. A holder for forming a plurality of wire strands into a bundle for assembling a cable harness, said holder comprising, in combination, a frame having a base for supporting the holder on a harness board or the like, said frame including a body portion open at its upper end to define a compartment elevated relative to said base for accommodating a plurality of wire strands, at least one movable arm supported from said frame and deflectable from a normal wire-retaining position substantially closing said upper end of said body portion to an open position permitting a plurality of wire strands to be passed through said open end into or out of said compartment, said arm being yieldingly biased to said normal wire-retaining position, and a stretchable elastic band extending across said open end of said body portion adjacent said arm at an upper portion of said compartment so as to be engaged and stretched by wire strands snapped past said arm into said compartment, said elastic band thereby forming into a compressed bundle of variable size up to the capacity of said compartment any desired number of wire strands which are snapped past said arm into said compartment by confining such wire strands between said elastic band and the under side of said arm in the normal wire-retaining position of the latter.*

*27. A holder as defined in claim 26 including two movable arms in opposed relation, said arms having free ends adjacent one another in the normal wire-retaining position of said arms to substantially close said upper end of said body portion.*

*28. A holder as defined in claim 26 wherein said movable arm is pivotally mounted on said frame.*

*29. A holder as defined in claim 26 where the lowest portion of said compartment is of arcuate configuration.*

*30. A holder as defined in claim 26 where said base includes means for anchoring the holder to a harness board or the like.*

*31. A holder as defined in claim 26 where said elastic band is wrapped over the outside of said movable arm to yieldingly bias the latter to its normal wire-retaining position.*

*32. A holder as defined in claim 27 where said two movable arms are pivotally mounted on said frame.*

*33. A holder as defined in claim 27 where a spring is utilized to bias said arms to their normal wire-retaining positions.*

*34. A holder as defined in claim 26 where said arm is flexible.*

*35. A holder as defined in claim 26 where said elastic band includes two elements comprising resilient material for elasticity and nonresilient material for limited extensibility.*

* * * * *

UNITED STATES PATENT AND TRADEMARK OFFICE

CERTIFICATE OF CORRECTION

PATENT NO. : Re. 29,037

DATED : November 16, 1976

INVENTOR(S) : Jack E. Caveney, Raymond F. Roberson, Joseph S. Rohaly

It is certified that error appears in the above-identified patent and that said Letters Patent are hereby corrected as shown below:

Column 11, line 67: [an] should not be in brackets

Column 13, line 3: "lowest" should be --lower--.

Signed and Sealed this

*Thirteenth* Day of *September 1977*

[SEAL]

*Attest:*

RUTH C. MASON
*Attesting Officer*

LUTRELLE F. PARKER
*Acting Commissioner of Patents and Trademarks*